United States Patent [19]  [11] 3,733,654
Willianson  [45] May 22, 1973

[54] HOSE CLAMP

[75] Inventor: Hugh C. Willianson, Willoughby, Ohio

[73] Assignee: Universal Metal Products, Inc., Wickliffe, Ohio

[22] Filed: May 10, 1971

[21] Appl. No.: 141,534

[52] U.S. Cl. ................................................24/20 TT
[51] Int. Cl. ..............................................B65d 63/02
[58] Field of Search........................24/20 TT, 20 CW

[56] References Cited

UNITED STATES PATENTS

| 2,318,816 | 5/1943 | Tinnerman | 24/20 TT |
| 3,235,925 | 2/1966 | Gerhardt et al. | 24/20 CW |
| 3,293,709 | 12/1966 | Holton | 24/20 TT |
| 3,321,811 | 5/1967 | Thomas | 24/20 CW |

FOREIGN PATENTS OR APPLICATIONS

| 630,008 | 12/1961 | Italy | 24/20 TT |

Primary Examiner—Donald A. Griffin
Attorney—Oberlin, Maky, Donnelly & Renner

[57] ABSTRACT

A hose clamp comprising a unitary spring metal strip having end portions which are curved to a radius equal to or less than the radius of the hose to be clamped, one end portion having circumferentially spaced from each other and from that end of the strip an inclined tongue and a tool abutment shoulder and the other end portion having circumferentially spaced from each other and from that end of the strip a series of circumferentially spaced apart transverse slots therethrough and a tool abutment shoulder. The length of the strip from the tongue to the farthest slot is preferably approximately equal to the circumference of the hose to be clamped so that the strip may be wrapped manually around the hose with the tongue engaged in said farthest slot without requiring use of any tool. By reason of the curved end portions of the strip, the end of the strip which contains the tongue will engage the outer surface of the hose, and, as the strip is wrapped around the hose, the end of the strip containing the slots will contact the first mentioned portion of the strip between the end thereof and the tongue and will slide therealong and be cammed radially outwardly by the tongue until such farthest slot registers with the tongue whereupon the slotted end portion will snap against the strip end portion which is against the hose to a holding position with the tongue engaged in the farthest slot. Thereafter, a tool such as a pair of pliers may be employed to squeeze the abutment shoulders toward each other thus to contract the strip around the hose with the tongue engaging a succeeding transverse slot to tightly clamp the hose against a nipple therewithin.

5 Claims, 5 Drawing Figures

INVENTOR.
HUGH C. WILLIAMSON
BY
Oberlin, Maky, Donnelly & Renner
ATTORNEYS

HOSE CLAMP

BACKGROUND OF THE INVENTION

Known ratchet and pawl type hose clamps while of unitary strip construction are of relatively complex form involving numerous manufacturing operations and are of curved form throughout their lengths thus to require either opening up of the clamp to place it around the hose to be clamped, or slipping the clamp over the end of the hose before the hose is placed over a supporting nipple. Moreover, such ratchet and pawl type hose clamps are generally formed with circumferentially extending reinforcing ribs thus requiring initial manufacture to curved form throughout their lengths.

SUMMARY OF THE INVENTION

In contradistinction to the foregoing, the present hose clamp is of simple stamped construction including a lancing operation to form two tool abutment shoulders and an inclined tongue, and a piercing operation to form a series of transverse slots through the strip, the strip being cut between the tongue and the series of transverse slots so that the portions of the strip adjacent the cut constitute the opposite ends of succeeding hose clamps.

It is another object of this invention to provide an adjustable hose clamp which for a major portion of its length is of straight form having curved end portions which are of radius equal to or smaller than the radius of the hose to be clamped thereby, whereby as the clamp is wrapped around the hose, the end of the clamp which contains the inclined tongue will engage the outer surface of the hose and as the other end is brought into position it will slide along the end of the clamp which is disposed against the hose and will be cammed by the inclined tongue for snapping into place when a transverse slot is in register with the end of the tongue. Moreover, the formation of the hose clamp in the form stated enables nesting together of clamps to conserve shipping and storage space.

It is another object of this invention to provide a hose clamp of the character indicated in which the length of the clamp from the inclined tongue to the transverse slot which is nearest the other end of the clamp is approximately equal to the circumference of the hose to be clamped whereby the clamp may be hand wrapped around the hose to a holding position, whereupon a tool may be applied to squeeze the abutment shoulders toward each other to position the tongue in a succeeding transverse slot to tightly grip the hose against a supporting nipple or the like.

Other objects and advantages of the present invention will appear hereinafter.

DETAILED DESCRIPTION OF THE INVENTION

Figure 1:
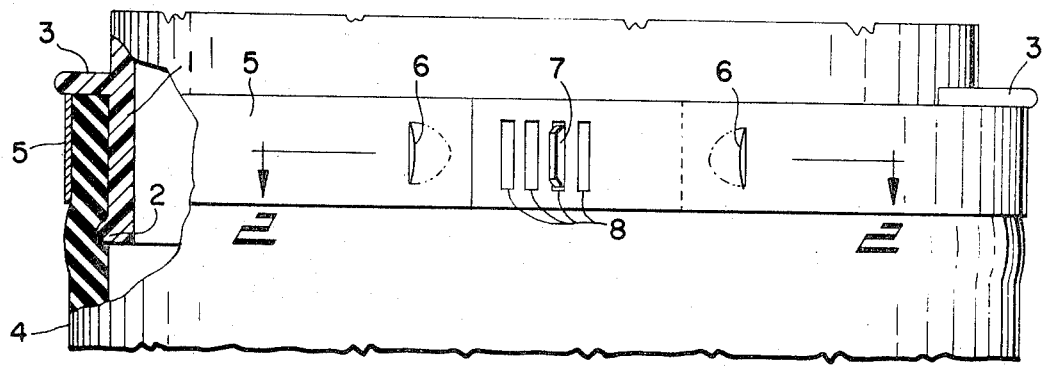
FIG. 1 is a side elevation view partly in radial cross-section showing the hose clamp constituting the present invention in operating position tightly clamping the end portion of a hose against a nipple therewithin.
Figure 2:
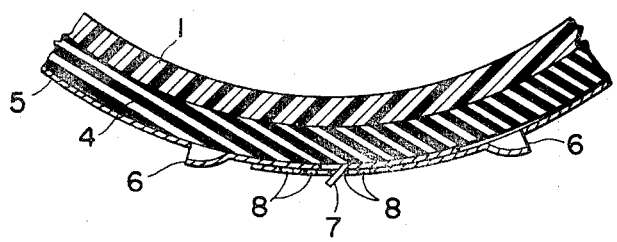
FIG. 2 is a cross-section view taken substantially along the line 2—2, FIG. 1.

In the assembly illustrated in FIG. 1, the nipple member 1 preferably has a bead 2 at its end and diametrically opposite flange portions 3 which constitute a locating stop for the end of the hose 4 and for one side of the hose clamp 5. The hose clamp 5 is contracted to tightly clamp the hose 4 against the nipple 1 as by engaging the abutment shoulders 6 between the jaws of a pair of pliers or like tool to cause engagement of the inclined tongue 7 adjacent one end of the clamp 5 with one of the transverse slots 8 formed adjacent the other end of the clamp 5.

The abutment shoulders 6 are formed as by a lancing operation as is the inclined tongue 7, and the transverse slots 8 are formed by a piercing operation. To facilitate manufacture, the hose clamps 5 herein are made from a continuous length of strip stock which is longitudinally fed through a punch press whereat the strip is lanced to form the oppositely disposed shoulders 6 and the inclined tongue 7 which has rounded corners for ease of entrance into the transverse slots 8 of the finished clamp and whereat the strip is pierced to form a plurality of transverse slots 8 therethrough. The strip is then cut between the tongue 7 and the series of transverse slots 8 to define the opposite end portions of successive clamps 5. The strip stock is also bent at the ends as shown in FIGS. 4 and 5 to a radius which is preferably equal to or smaller than the radius of the hose 4 which is to be clamped, and preferably the length of the clamp 5 from the tongue 7 to the first transverse slot 8 is approximately equal to the circumference of the hose 4 which is to be clamped.

Figure 4:
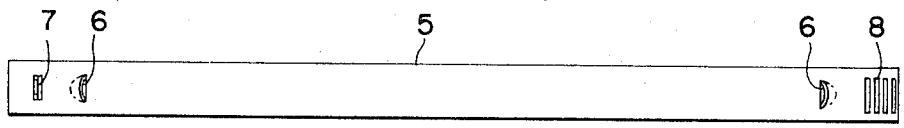
FIGS. 4 and 5 are top plan and side elevation views illustrating the clamp in its manufactured condition including a straight intermediate portion and curved end portions.
Figure 5:
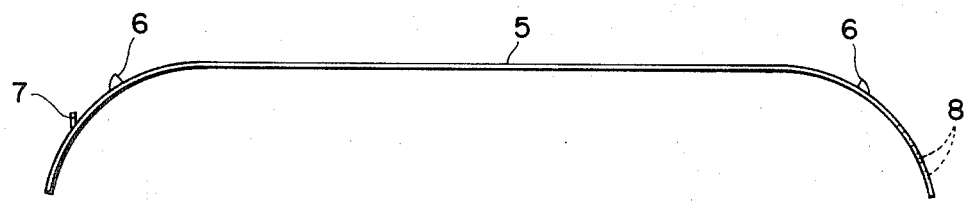

The hose clamp 5 thus formed and having the shape of FIGS. 4 and 5 is then heat treated when made of spring steel, for example.

Figure 3:
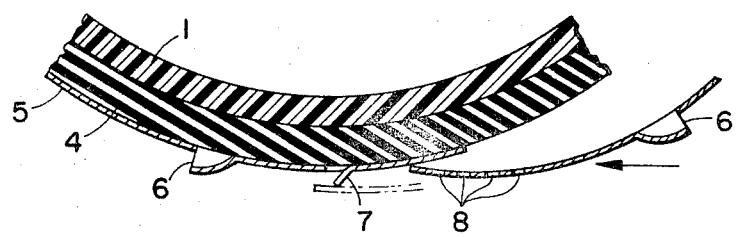
FIG. 3 is a view similar to FIG. 2 showing how the clamp is manually wrapped around the hose and how the approaching end slides along the other end of the clamp and is cammed outwardly by the inclined tongue for automatic snapping together of the end portions of the clamp when the tongue registers with a transverse slot.

In making the assembly of FIG. 1, the curved end portion containing tongue 7 is placed against the outer surface of the hose with the tongue 7 inclined outwardly as shown in FIG. 3, and then the remainder of the clamp 5 is wrapped progressively around the hose 4 until the curved end portion containing the series of slots 8 engages the tongue end portion of the clamp as shown in FIG. 3. By reason of the curvature of the end portions of the hose clamp 5, the tongue end will be in contact with the hose 4 so that the curved slotted end will engage the outer surface of the clamp 5 and slide therealong toward the tongue 7 when force is applied as indicated by the arrow in FIG. 3. When the slotted end engages the inclined tongue 7 it will be sprung outwardly as shown in phantom lines in FIG. 3, and when the first transverse slot 8 registers with the end of the tongue 7, the slotted end will snap down against the outer surface of the tongue end of the clamp 5 to hold the clamp 5 around the hose 4. The foregoing operation is easily performed by hand and while the clamp 5 is thus held, the jaws of a pair of pliers or like tool may be applied to the oppositely facing abutment shoulders 6 to squeeze them toward each other causing the slotted end of the clamp 5 to climb over the inclined tongue 7 and to snap radially inwardly into the next transverse slot 8 and succeeding slots 8 until the clamp 5 is tensioned to desired amount to effect firm clamping of the hose 4 against the outer surface of the nipple member 1.

Although the present invention has been described herein particularly for use as a hose clamp 5 to clamp a hose 4 of rubber-like material against a nipple member 1, it is to be understood that the clamp 5 herein may be used for other purposes such as retaining insulation around an air conditioning conduit, in which case, the clamp 5 need not be made of heat treated spring metal, but instead, may be low carbon steel such as S.A.E. 1010.

By way of illustrative example, clamps 5 made of length to be used with 2 ¼ inch diameter, 2 ⅝ inch diameter and 3 ⅜ inch diameter hose 4 may be stamped from 0.017 × 0.375 inch annealed spring steel stock and formed with curved end portions of about 1 ⅛ inch inside radius and extending about 75° from the intermediate straight portion. The clamps 5 thus formed may then be heat treated to about 44–48 Rockwell C. As shown, the tongue 7 has rounded corners and is slightly shorter than the length of the slots 8 to facilitate snapping of the slotted end of the hose clamp 5 into place when one of the slots 8 registers with the tongue 7.

I, therefore, particularly point out and distinctly claim as my invention:

1. A hose clamp comprising a strip of flexible material having curved end portions which are adapted to circumferentially overlap each other when said strip is wrapped around a hose; one end portion having an integral inclined tongue circumferentially spaced from that end of the strip and an integral tool abutment shoulder circumferentially spaced from said tongue farther away from that end, and the other end portion having a series of transverse slots therethrough circumferentially spaced from that end of said strip and an integral tool abutment shoulder circumferentially spaced from said series of slots farther away from that end; the radius of curvature of said end portions being such that during wrapping of said strip around a hose the end of said one end portion engages the hose and the end of said other end portion slides along the outer surface of said one end portion toward said inclined tongue and is cammed outwardly by said tongue until the first transverse slot registers with said tongue at which time said other end portion snaps inwardly into engagement with said one end portion to retain said end portions together around the hose; the length of said strip from said tongue to said first transverse slot being approximately equal to the diameter of the hose to be clamped whereby wrapping of said strip around the hose as aforesaid may be done manually; said clamp when wrapped around the hose as aforesaid having said tool abutment shoulders facing in opposite directions for engagement by plier jaws or the like for causing said shoulders to approach each other without imposition of tensile load on the portion of said strip containing said series of slots while said tongue cams said other end portion outwardly for snapping into engagement with the second or succeeding transverse slot thus to contract the clamp tightly around said hose.

2. The hose clamp of claim 1 wherein said abutment shoulders project substantially radially of said clamp to prevent slippage of the plier jaws or the like when said clamp is tightened around the hose.

3. The hose clamp of claim 1 wherein said tool abutment shoulders comprise lanced portions of the strip which are sheared transversely between the edges of said strip, one side of each shear line being deformed to curved form to constitute such abutment shoulder projecting radially from the clamp when installed on a hose.

4. The hose clamp of claim 1 wherein said inclined tongue constitutes a lanced portion of the strip which is sheared transversely between the opposite edges of said strip and longitudinally at the ends of said transverse shear line and which is deformed angularly outwardly from the surface of said strip whereby the outer surface of said tongue constitutes a cam surface to cam said other end portion of said strip outwardly as the clamp is wrapped around the hose or as the clamp is tightened around the hose by squeezing pressure applied on said tool abutment shoulders, and the inner surface of said tongue constitutes a hook to engage one side of a transverse slot to retain said other end portion in overlapped contacting relation to said one end portion.

5. The hose clamp of claim 4 wherein said tongue has rounded corners and is of length transversely of said strip less then the length of said slots transversely of said strip to facilitate snapping of said other end portion over said tongue into clamp locking relation.

* * * * *